US012791328B2

(12) United States Patent
Chen

(10) Patent No.: US 12,791,328 B2
(45) Date of Patent: Nov. 10, 2026

(54) METHODS AND SYSTEMS FOR PROVIDING A PACE INDICATOR IN AN EXTENDED REALITY ENVIRONMENT

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 352 days.

(21) Appl. No.: 17/977,129

(22) Filed: Oct. 31, 2022

(65) Prior Publication Data

US 2024/0142243 A1 May 2, 2024

(51) Int. Cl.
*G01C 21/34* (2006.01)
*G01C 21/36* (2006.01)

(52) U.S. Cl.
CPC ....... *G01C 21/343* (2013.01); *G01C 21/3691* (2013.01)

(58) Field of Classification Search
CPC .............. G01C 21/343; G01C 21/3691; G01C 21/3484; G06T 19/006; G02B 27/0172; G02B 2027/0141; G02B 2027/0178; G02B 27/0093; G06F 3/012; G06F 3/011; H04W 4/80; G16H 20/30; G16H 40/63; H04L 67/306
See application file for complete search history.

(56) References Cited

U.S. PATENT DOCUMENTS

2010/0057951 A1* 3/2010 Ellis ...................... H04W 4/029 710/33
2018/0005429 A1* 1/2018 Osman .................... A63F 13/56
2019/0311539 A1* 10/2019 Hogue .................... G16H 40/63
2020/0151961 A1* 5/2020 Viner ...................... G06F 3/011
2023/0019375 A1* 1/2023 Ohnemus ............... G16H 20/70

FOREIGN PATENT DOCUMENTS

JP 2020150987 A * 9/2020
KR 101571361 B1 * 11/2015 ............. A63B 24/00

* cited by examiner

*Primary Examiner* — Temesghen Ghebretinsae
*Assistant Examiner* — Karin Kiyabu
(74) *Attorney, Agent, or Firm* — HG LAW LLP

(57) ABSTRACT

Systems and methods are described for providing a pace indicator in an extended reality environment. First route data of a first route, wherein the first route data comprises a pace of a first user moving along the first route. Second route data of a second route is determined, wherein the second route data comprises a pace of the second user moving along the second route. A pace indicator is provided to the first user moving along the first route based on the first route data and second route data, wherein the pace indicator comprises an avatar moving along the first route in an extended reality environment, the avatar representing the second user moving along the second route.

20 Claims, 7 Drawing Sheets

METHODS AND SYSTEMS FOR PROVIDING A PACE INDICATOR IN AN EXTENDED REALITY ENVIRONMENT

BACKGROUND

The present disclosure relates to methods and systems for providing a pace indicator to a user in an extended reality environment. Particularly, but not exclusively, the present disclosure relates to providing a pace indicator to a user moving along a route, the pace indicator accounting for a pace of another user moving along another route and/or differences in the conditions of various routes.

SUMMARY

Extended reality (XR) experiences, such as virtual, augmented and mixed reality experiences and gaming, provide environments in which a user can see and interact with other virtual users. As a result of the proliferation of devices like head-mounted displays, an XR experience may become more common for use in fitness and sporting activities, e.g., to make an athlete or a recreational consumer aware of the performance of one or more other users or the conditions of another location. In particular, it is desirable to allow users at different geographical locations to train or compete concurrently in an XR environment, e.g., taking into account varying levels of ability of the users and difference between respective environments.

Systems and methods are provided herein for improving how a pace of user is indicated in fitness and sporting activities, e.g., by providing to a user participating in an activity in one location data relating to another activity in another location. For example, such data may be data relating to a pace of the other user participating in the activity in the other location and/or data relating to conditions of a route forming at least part of the activity in the other location. In some examples, the systems and methods provided herein relate to providing an avatar in an XR environment, the avatar indicating how the performance of a user participating in an activity in first location compares to the performance of another user participating in a similar activity in a second location. In particular, the pace of the avatar may be adjusted or scaled based on the pace of the other user in the second location and/or conditions at the second location, e.g., to provide an XR experience in which users of varying levels of ability can participate together, virtually, in an activity, irrespective of environmental conditions local to each user. However, more generally, the present disclosure extends to providing a pace indicator to a user using any appropriate audio/visual system, such as a lighting system provided on a route, e.g., a track-side or curb-side LED lighting system or a projection-based lighting system.

According to some examples, methods and systems disclosed herein provide a pace indicator to a user. In particular, the pace indicator may be provided in (or as part of) an XR environment. First route data, e.g., of a first route, is determined. Second route data, e.g., of a second route, is determined. For example, first and second route data may each comprise data relating to the performance of respective users and/or data relating to the conditions at respective locations of, or associated with, each user. For example, first route data may comprise a pace of a first user moving along a first route, and second route data may comprise a pace of a second user moving along a second route. A pace indicator is provided to a user based on the first and second route data.

For example, a pace indicator may be provided to a first user based on the second route data and the pace of the first user moving along the first route. Additionally or alternatively, a pace indicator may be provided to a second user based on the first route data and the pace of the second user moving along a second route. In particular examples, the pace indicator comprises, at least, an avatar moving along a route in an extended reality environment. For example, the avatar may represent, in an extended reality environment provided to the first user, the second user moving along the first route, e.g., as the first user moves along the first route. Additionally or alternatively, the avatar may represent, in an extended reality environment provided to the second user, the first user moving along the second route, as the second user moves along the second route.

In some examples, the first route data may comprise data relating to a first user and the second route data may comprise data relating to a second user. For example, a first user and a second user may be different users, e.g., different users (individuals) moving along different routes or the same route a different time. In some examples, the first route data and the second route data may comprise data relating to a single user. For example, a user may be labelled as a first user when training at a first time, e.g., on a route, and the same user may be labelled as a second user when training at a second time, e.g., on the same route (or a different route).

In some examples, first route data may comprise a condition of the first route, such as an environmental condition of the first route and/or a physical condition of the first route. Second route data may comprise a condition of the second route, such as an environmental condition of the second route and/or a physical condition of the second route. A pace indicator may be provided to the first user based on the condition of the first route, the condition of the second route and the pace of the first user moving along the first route. A pace indicator may be provided to the second user based on the condition of the first route, the condition of the second route and the pace of the second user moving along the second route.

In some examples, the pace of the first user moving along the first route is determined concurrently with the pace of the second user moving along the second route. The pace indicator may be provided based on the current pace of the first user moving along the first route and the current pace of the second user moving along the second route. The pace indicator may be provided as the first user moves along the first route and as the second user moves along the second route. In some examples, the pace indicator is provided in real time or near real time.

In some examples, an event is scheduled in which the first and second users participate (or plan to participate). The event may comprise the first user moving along the first route and the second user moving along the second route, e.g., at the same time or at different times. In some examples, the first route may be geographically separated from the second route. In some examples, a communication link between the first user and the second user may be initiated for the event, e.g., so that the first and second users can communicate with each other as they participate in the event.

In some examples, a difference between a condition of the first route and the condition of the second route is determined. For example, the difference may be a difference between the topography of the first and second routes, and/or a difference between weather conditions at the first and second routes. In some examples, the pace indicator may be updated in response to the difference between the condition of the first route and the condition of the second route being above a difference threshold. In some examples, the condition of the first route and/or the condition of the second route may be monitored, e.g., to determine a change in the condition of the first route and/or the condition of the second route during the scheduled event.

In some examples, route data comprises an effort level, e.g., an energy expenditure, or an estimated or perceived effort of a user. For example, a current effort level of the first user and/or the second user may be determined, e.g., as each user moves along a respective route. A target effort level of the first user may be determined based on the current effort level of the first user and the second route data. A target effort level of the second user may be determined based on the current effort level of the second user and the first route data. In some examples, the pace indicator is updated based on the target effort level. In some examples, an effort level of the first user moving along the first route is determined and an effort level of the second user moving along the second route is determined, either separately or in parallel. In some examples, a difference between the effort level of the first user moving along the first route and effort level of the second user moving along the second route may be determined. In response to determining that there is a difference, the pace indicator may be updated.

In some examples, the pace indicator is provided as an object in an XR environment. For example, a pace indicator, which is provided to the first user on the first route, may comprise an avatar in the XR environment, the avatar representing the performance of the second user on the second route. In some examples, a position of the avatar in the extended reality environment relative to the first user may be based on a scaling function applied to the second route data. Additionally or alternatively, a pace indicator, which is provided to the second user on a second route, may comprise an avatar in the XR environment, the avatar representing the performance of the first user on the first route. In some examples, a position of the avatar in the extended reality environment relative to the second user may be based on a scaling function applied to the first route data. In this manner, where the pace of the first user is different from the pace of the second user, the respective positions of the avatars can be determined and updated so as to provide the respective avatars near or next to each user. For example, where one user is faster or slower than another user, e.g., based on physical ability and/or route conditions, the position of the avatar representing the faster or slower user may be adjusted so as to bring the avatar closer to or further away from the other user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
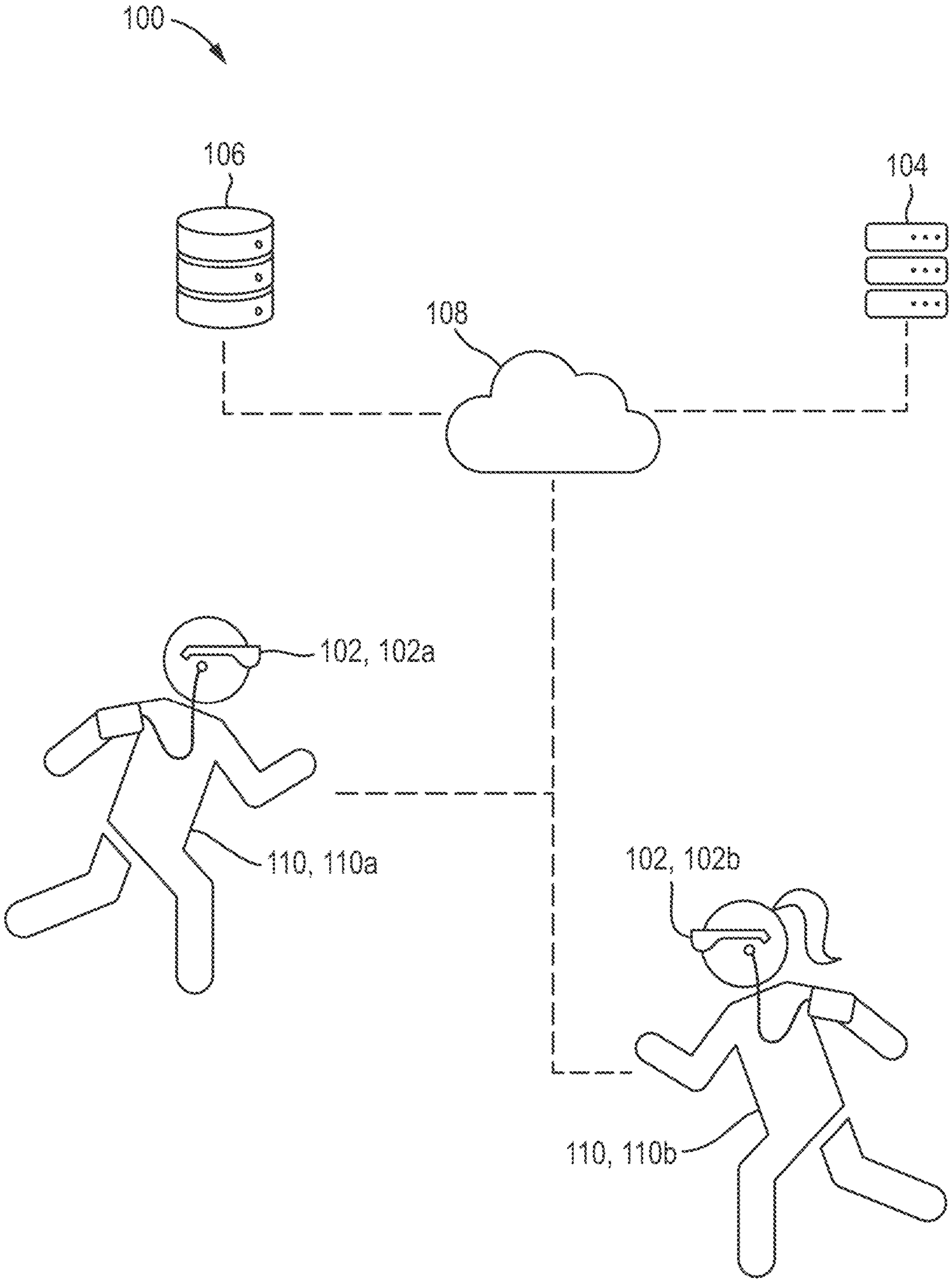
FIG. 1 illustrates an overview of the system for providing a pace indicator, in accordance with some examples of the disclosure.

FIG. 1 illustrates an overview of a system 100 for providing a pace indicator, e.g., to a user in an XR environment. In particular, the example shown in FIG. 1 illustrates users 110 each having a user device 102 communicatively coupled to a server 104 and a content item database 106, e.g., via network 108. In this manner, the user device 102 may access an XR environment or service provided by a content provider operating server 104. For example, the XR environment may be a virtual, augmented or mixed reality environment accessible to user 110 when operating user device 102. In particular, the XR environment may be an augmented or mixed reality environment provided by a head-mounted display, which allows for one or more virtual overlays to be displayed to user 110, e.g., as user 110 is running along a route. In other examples, the XR environment may be a virtual reality environment provided by a head-mounted display, which provides a virtual exercise arena, e.g., as the user is cycling along a route on a static bike in a gym.

In the example shown in FIG. 1, a first user 110*a* is running along a first route, e.g., the route of the Boston marathon, and a second user 110*b* is running along a second route, e.g., the route of the London marathon. Each user device 102 is connected to server 104 so that data relating to a route may be obtained at user device 102. For example, route data relating to the first route (first route data) may be accessed by the user device 102 of each of the first and second users 110*a*, 110*b*. Likewise, route data relating to the second route (second route data) may be accessed by the user device 102 of each of the first and second users 110*a*, 110*b*. In some examples, route data may comprise the pace of a user moving along the route. For example, each user device 102 may be configured to determine a pace of the user 110 moving along a route, and transmit such route data to server 104 for access by one or more other user devices 102. In this manner, user 110*a* is able to be made aware of the current (or historic) pace of user 110*b* along the second route as user 110*a* moves along the first route, and vice versa. Additionally or alternatively, route data may comprise information relating to a condition of a route. For example, a route condition may be a physical condition of a route, such as, but not limited to, the topography of the route (e.g., relating to gradient, surface type/condition, location of and relationship between turns and waypoints along a route, etc.), environmental conditions along the route (e.g., weather conditions), and/or one or more other contextual factors (e.g., time of day, time of year, number of users along a route, etc.). Route data relating to a condition of a route may be stored, e.g., on server 104, for access by a user device 102. In some examples, a user device 102 may be configured to determine, e.g., in real time or near real time, a condition of a route, and transmit such data to server 104 for access by another user device 102. In this manner, user 110*a* is able to be made aware of the conditions of the route that user 110*b* is moving along (or has moved along) as user 110*a* moves along the first route, and vice versa. In some examples, route data may be stored on database 106 for access by user device 110. For example, as user 110*a* moves along the first route, user device 102*a* may be configured to access, at database 106, historic route data captured by user device 102, and vice versa.

As such, system 100 is configured to provide a pace indicator to a user based on the pace of the user on a route and data relating to another route. For example, user 110*a* may be provided with a pace indicator showing a comparative pace as user 110*a* moves along the first route and user 110*b* moves along the second route. Additionally or alternatively, user 110*a* may be provided with a pace indicator showing a comparative pace based on one or more differences between conditions along the first route and conditions along the second route. In the context of the present disclosure, a pace indicator may comprise one or more aural/visual indications configured to convey information that compares route data of respective routes, e.g., as a user is moving along a route. For example, a pace indicator may indicate a difference between a pace of a user moving along a first route and a pace of another user moving along a second route, e.g., as both users move along respective routes. Additionally or alternatively, a pace indicator may indicate a difference between a condition of a first route and a condition of a second route, e.g., as a user moves along the first route. In some examples, the pace indicator may comprise one or more display elements provided in an XR environment that show how the performance of a user moving along a route compares to another user moving along another route, e.g., in real time or near real time. In particular, the pace indicator may comprise an avatar representing another user. For example, the pace indicator, provided to a first user moving along a first route, may comprise an avatar representing the pace of a second user moving along a second route. In this manner, as the first and second users move along respective routes, the first user may be provided with a live representation of the pace of the second user, wherein the avatar representing the second user moving along the first route is overlaid, in the XR environment, onto the first route as the first user moves along the first route. Additionally or alternatively, the second user may be provided with a live representation of the pace of the first user, wherein the avatar representing the first user moving along the second route is overlaid, in the XR environment, onto the second route as the second user moves along the second route.

The systems and methods disclosed herein enable augmentation of a recreational consumer fitness activity or a competitive athletic event, across a variety of sport types, such as running, cycling, swimming, etc. When implemented, a digital and enhanced experience can be provided to a user as they perform an activity, e.g., in real time or near real time. The augmentation enables connection between users during activities, which is differentiated from merely providing and sharing performance data amongst users. In particular, systems and methods disclosed herein may enable users to communicate and socialize during an activity, e.g., by providing virtual training/competition partner. For example, a first user in a first location moving along a first route can train/compete next to a second user in a second location moving along a second route, e.g., irrespective of differences in the abilities of the users. Moreover, systems and methods disclosed herein can account for inherent differences in conditions between routes, which improves the ability for users in different locations to accurately compare pace and performance. For example, barriers to accurately comparing pace and performance between users, such as different time zones, different whether conditions, different altitude, etc. will be eliminated. For example, a user running in snow may become a partner, in real time, for another user who exercises in a sunny afternoon. Again, the users exercise at different paces in real world, but they are brought together in the augmented experience. In particular, each user can perceive the partner running, or otherwise moving, at a same pace, e.g., by their side in an XR environment.

In the example shown in FIG. 1, system 100 includes at least one user device 102, such a head-mounted display (HMD), a tablet computer, a smartphone, or the like, used either alone or in combination, configured to display or otherwise provide access to an XR environment. It is to be understood, however, that the systems and methods disclosed herein are not limited to being implemented in an XR environment. For example, a pace indicator, are described herein, may be provided to a user in any appropriate audio/visual manner, e.g., by virtue of a user device 102 comprising a headset and/or display screen. System 100 may also include network 108 such as the Internet, configured to communicatively couple user device 102 to one or more servers 104 and/or one or more content databases 106 from which content, such as route data and/or other media content, may be obtained for display, e.g., in the XR environment. User device 102 and the one or more servers 104 may be communicatively coupled to one another by way of network 108, and the one or more servers 104 may be communicatively coupled to content database 106 by way of one or more communication paths, such as a proprietary communication path and/or network 108.

Figure 2:
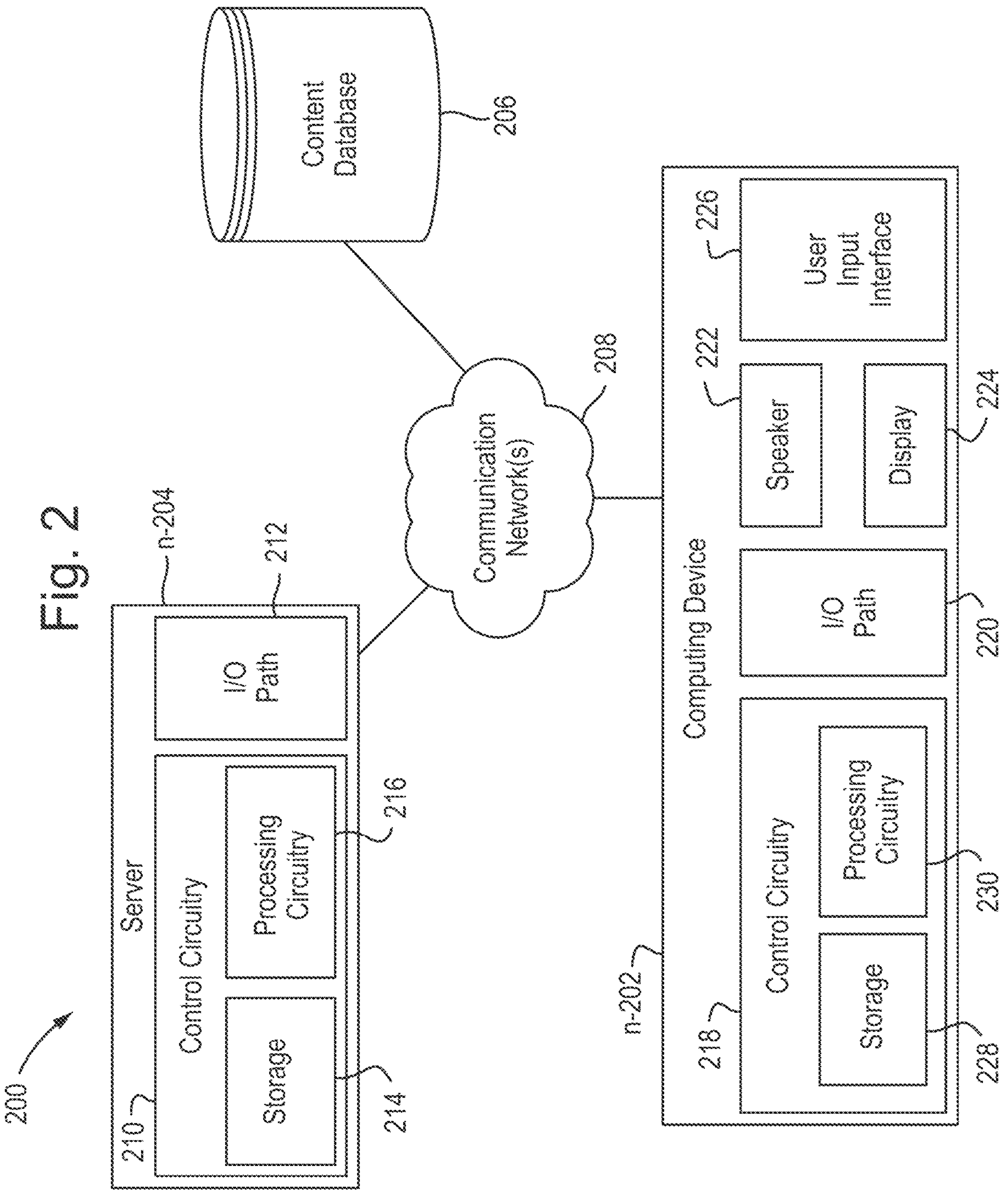
FIG. 2 is a block diagram showing components of an example system for providing a pace indicator, in accordance with some examples of the disclosure.

FIG. 2 is an illustrative block diagram showing example system 200, e.g., a non-transitory computer-readable medium, configured to provide a pace indicator to a user. Although FIG. 2 shows system 200 as including a number and configuration of individual components, in some examples, any number of the components of system 200 may be combined and/or integrated as one device, e.g., as user device 102. System 200 includes computing device n-202, server n-204 (denoting any appropriate number of computing devices, such as user device 102, and servers, such as server 104), and one or more content databases 206, each of which is communicatively coupled to communication network 208, which may be the Internet or any other suitable network or group of networks. In some examples, system 200 excludes server n-204, and functionality that would otherwise be implemented by server n-204 is instead implemented by other components of system 200, such as computing device n-202. For example, computing device n-202 may implement some or all of the functionality of server 104, allowing computing device n-202 to communicate directly with server 112. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be a HMD, a personal computer, a laptop computer, a tablet computer, a smartphone, a smart television, or any other type of computing device, includes control circuitry 218, I/O path 220, speaker 222, display 224, and user input interface 226. Control circuitry

218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to initiate an XR experience and allow a user to view and interact with another user in an XR environment, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database 206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
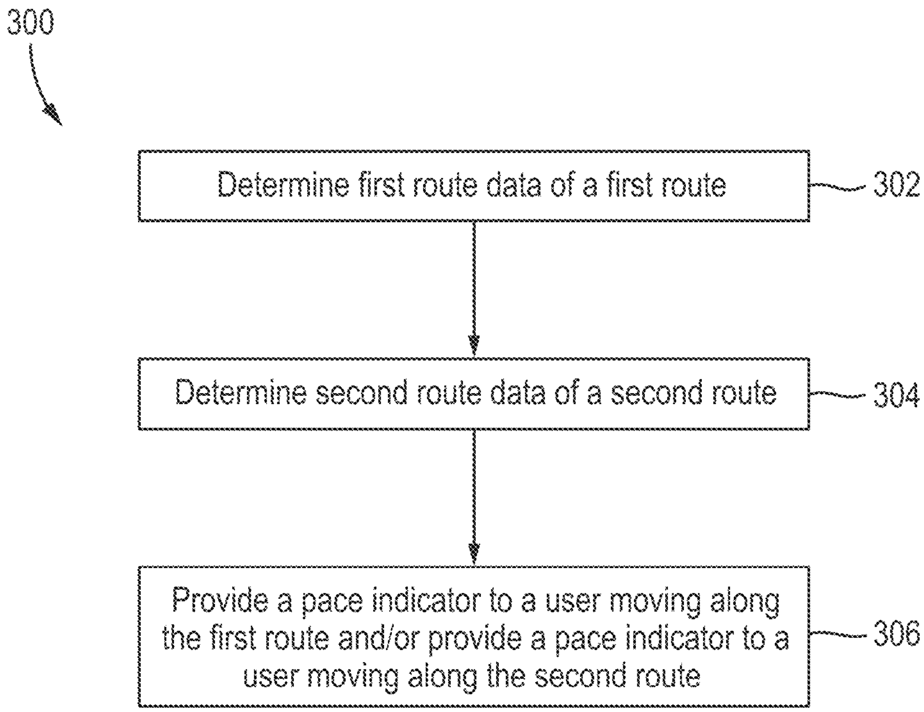
FIG. 3 is a flowchart representing a process for providing a pace indicator, in accordance with some examples of the disclosure.
Figure 4A:
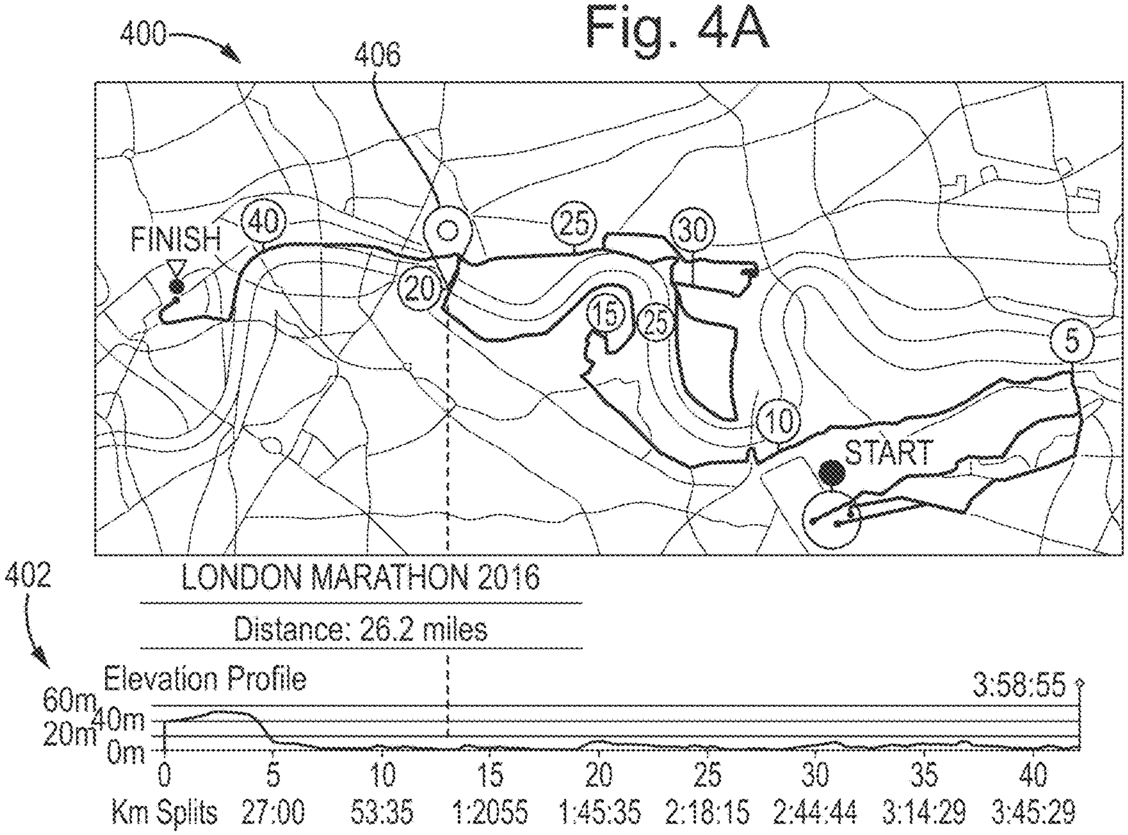
FIG. 4A illustrates a route, in accordance with some examples of the disclosure.
Figure 4B:
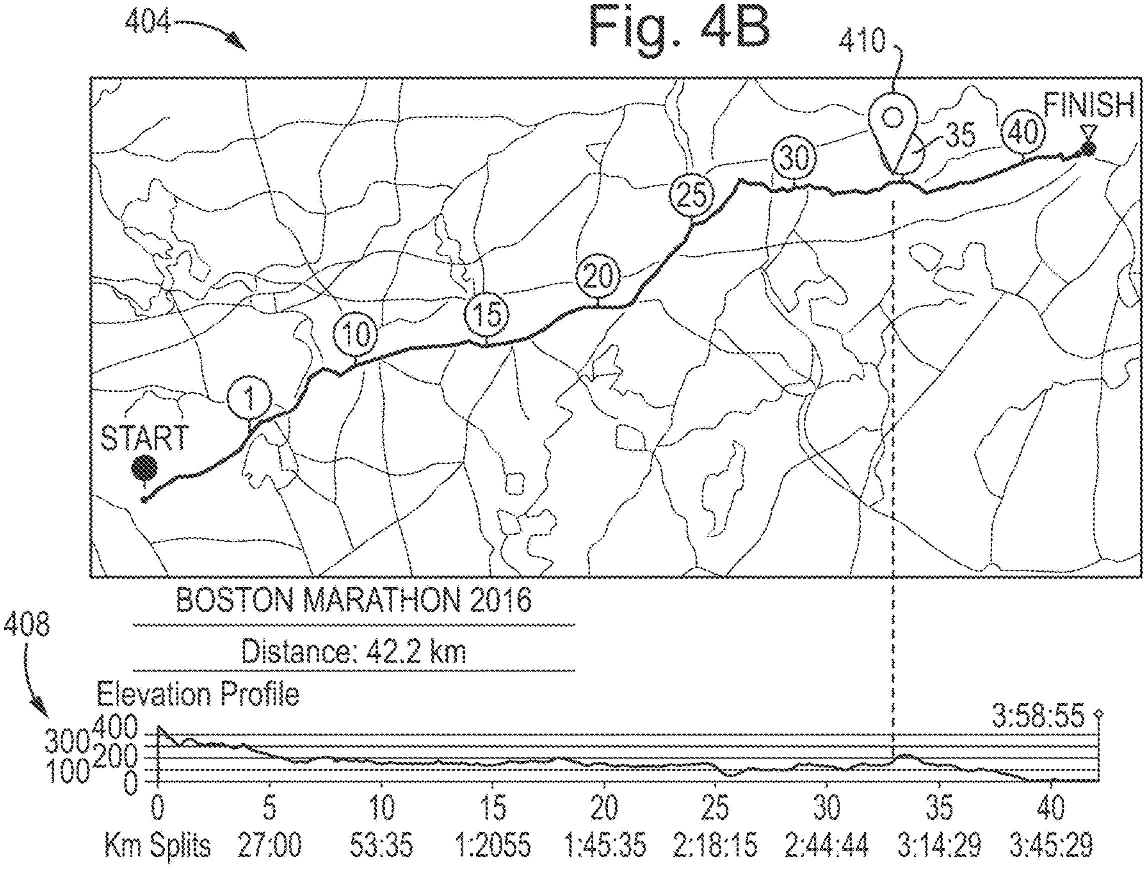
FIG. 4B illustrates another route, in accordance with some examples of the disclosure.
Figure 5:
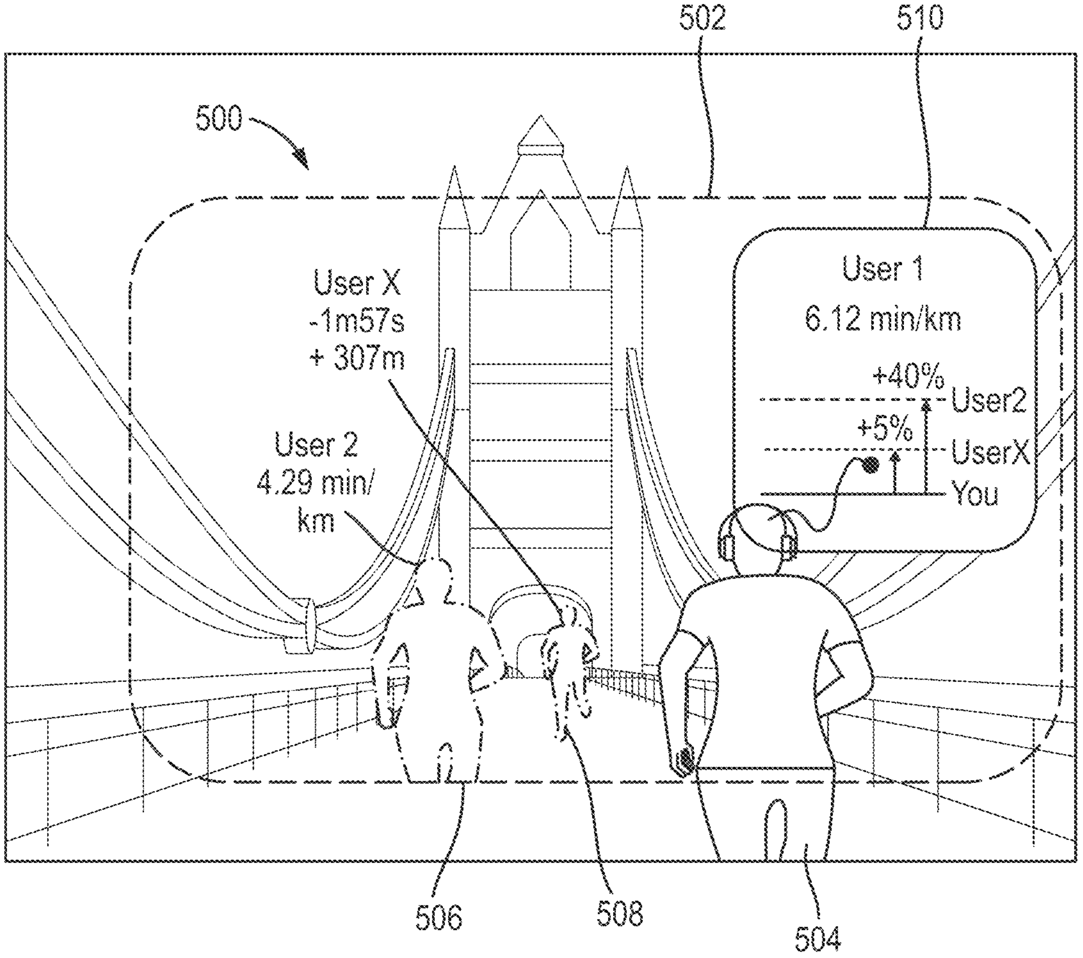
FIG. 5 illustrates an example of a system for providing a pace indicator in an extended reality environment, in accordance with some examples of the disclosure.

FIG. 3 shows a flowchart representing an illustrative process 300 for providing a pace indicator, e.g., in an XR environment. FIG. 4A illustrates an example of a first route. FIG. 4B illustrates an example of a second route. FIG. 5 illustrates an example of a system for providing a pace indicator in an extended reality environment. While the example shown in FIGS. 3 to 5 refers to the use of system 100, as shown in FIG. 1, it will be appreciated that the illustrative process shown in FIGS. 3 to 5, may be implemented on system 100 and system 200, either alone or in combination with each other, and/or any other appropriately configured system architecture.

At 302, control circuitry, e.g., control circuitry of user device 102*a* and/or server 104, determines first route data of a first route. For example, as discussed above, first route data may comprise data relating to the performance of a user, e.g., the current performance user 110*a* on a first route 400, such as the London marathon route, shown in FIG. 4A. Additionally or alternatively, first route data may comprise data relating to one or more conditions of a first route 400, such as a physical condition of the London marathon route, like elevation profile 402 and/or the weather conditions on a particular day. For example, control circuitry of user device 102*a* may determine a current pace of user 110*a* moving along a first route 400 and account for a current condition of the first route 400. In the example shown in FIG. 4A, control circuitry of user device 102*a* determines that user 110*a* is at position 406 on the first route 400, is moving at 6.12 min/km, the incline is 0.25% and the weather is mild. In this example, user 110*a* is a below average runner. For the sake of clarity, in some examples, the first route data may be information provided about the first route 400, such as the conditions of the route, without requiring the first user 110*a* to be currently moving along the route. For example, the first route data may be historic data stored in database 106.

At 304, control circuitry, e.g., control circuitry of user device 102*b* and/or server 104, determines second route data. For example, second route data may comprise data relating to the performance of a user, e.g., a current pace of user 110*b* on a second route 404, such as the Boston marathon route, shown in FIG. 4B. Additionally or alternatively, second route data may comprise data relating to one or more conditions of a second route 404, such as a physical condition of the Boston marathon route, like elevation profile 408 and/or the weather conditions on a particular day. For example, control circuitry of user device 102*b* may determine a current pace of user 110*b* moving along a second route 404 and account for a current condition of the second route 400. In the example shown in FIG. 4B, control circuitry of user device 102*b* determines that user 110*b* is at position 410 on the second route 404, is moving at 4.29 min/km, the incline is 3.3% and the weather is sunny. In this example, user 110*b* is a relative good runner. For the sake of clarity, in some examples, the second route data may be information provided about the second route 404, such as the conditions of the route, without requiring the second user 110*b* to be currently moving along the route. For example, the second route data may be historic data stored in database 106.

At 306, control circuitry, e.g., control circuitry of user device 102*a*, user device 102*b* and/or server 104, provides a pace indicator to the first and/or second user 110*a*, 110*b* based on the first route data and second route data. For example, control circuitry of the first user device 102*a* may be configured receive data from the second user device 102*b* relating to the current position 410 and pace of user 110*b* along route 404, and to access database 106 to retrieve information relating to the second route 404, e.g., elevation at location 410. In this manner, first user device 102*a* is made aware of the current performance of the second user 110*b* for a given position along the second route 404. Additionally or alternatively, control circuitry of user device 102*b* may be configured receive data from the first user device 102*a* relating to the current position 406 and pace of user 110*a* along route 400, and to access database 106 to retrieve information relating to the first route 400, e.g., elevation at location 406. In this manner, second user device 102*b* is made aware of the current performance of the first user 110*a* for a given position along the first route 400.

In the example shown in FIG. 5, a pace indicator 500 is provided as an augmented reality display. To add context, FIG. 5 shows an image of what user 110*a* sees crossing Tower Bridge, which is part of the route of the London marathon. For the sake of clarity, the current example does not assume that the users 110*a* and 110*b* are competing concurrently in the London and Boston marathons. Instead, the current example is used to illustrate that different users may be running along different geographically-separated routes (e.g., sections of different marathons) at the same time. In the example shown in FIG. 5, pace indicator 500 comprises a display window 502 projected over the field of vision the first user 110*a*, who can see route 404 ahead and another real-life runner 504. Within display window 502, the pace indicator 500 provides one or more visual display elements, such as avatar 506, avatar 508 and graphical display element 510. For example, avatar 506 may represent the current pace of user 110*b* moving along the second route 404, and avatar 508 may represent a "personal best" pace of user 110*a* (or the historic pace of another user, i.e., other route data) moving along the first route 400. Graphical display element 510 provides a display of first route data, e.g., information on the current performance of the first user 110*a*, and relates that information to the second route data, e.g., by comparing the current pace of the second user 110*b* to the pace of the first user 110*a*. In particular, pace indicator 500 provides avatar 506 in a manner that enables the first user 110*a* to run alongside a virtual representation of the second user 110*b*, despite the differences in pace of the users 110*a*, 110*b*. For example, if the pace indicator 500 were to display avatar 506 at a pace that represented accurately the pace of the second user 110*b* to the pace of the second user 110*b*, the difference in the paces would cause avatar 506 to run off into the distance, visible only for a short period by the first user 110*a*. Pace indicator 500 is therefore configured to display a scaled or adjusted representation of the second user 110*b*, to allow the first user 110*a* to run, virtually, next to or near the second user 110*b*, while, optionally, displaying the actual performance of the first user 110*a* to the second user 110*b*. In some examples, the paces of the users 110*a*, 110*b* may be scaled or adjusted to cause a gradual increase or decrease in separation between the second user 110*b* and avatar 506, e.g., so that the first user 110*a* can experience an amount of gained or lost ground on the second user 110*b*. In other words, pace indicator 500 may provide a "handicap" on the performance of the second user 110*b* to allow the first user 110*a* to train next to the second user 110*b*. The present disclosure, thus, beneficially allows users having differing levels of ability to perform, virtually, with one another, e.g., irrespective of the relative conditions in which each user is performing.

The actions or descriptions of FIG. 3 may be done in any suitable alternative orders or in parallel to further the purposes of this disclosure.

Figure 6:
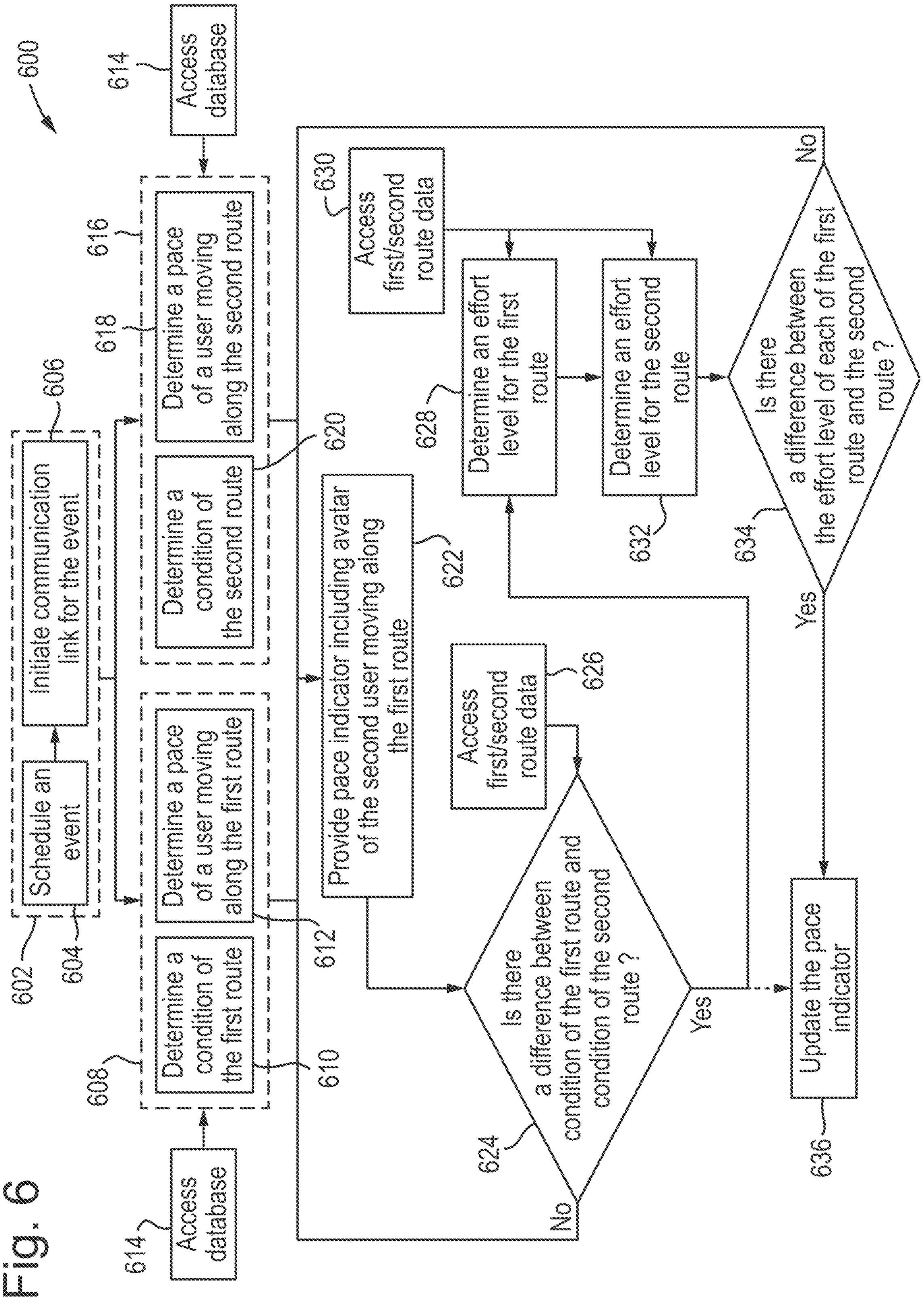
FIG. 6 is a flowchart representing a process for updating a pace indicator in an XR environment, in accordance with some examples of the disclosure.

FIG. 6 shows a flowchart representing an illustrative process 600 for updating a pace indicator, e.g., in an XR environment. While the example shown in FIG. 6 refers to the use of system 100, as shown in FIG. 1, it will be appreciated that the illustrative process shown in FIG. 6, may be implemented on system 100 and system 200, either alone or in combination with each other, and/or any other appropriately configured system architecture.

At 602, control circuitry, e.g., control circuitry of user device 102*a*, user device 102*b* and/or server 104, establishes participation of first and second users 110*a*, 110*b* in an event, such as a training session or a race. The example described below, the event comprises a training session in which first and second users 110*a*, 110*b* complete at least a portion of first and second routes 400, 404, respectively. As such, the below example uses the term "training session" for the event in which first and second users 110*a*, 110*b* participate. However, the event may be any appropriate type of event in which multiple users can participate. In the example shown in FIG. 6, control circuitry allows for users 110*a*, 110*b* to schedule participation in the training session at 604. For example, control circuitry may be configured to allow users 110*a*, 110*b* to arrange a common time at which they will train together. In other examples, control circuitry may be configured to allow each user 110a, 110b to each arrange a time at which they will train. For example, first and second users 110a, 110b may be in different time zones and so it may not be convenient to train at the same time. As such, first user 110a may schedule to complete a first training session at a first time and second user 110b may schedule to complete a second training session at a second time, the first and second training sessions thus comprising the event. For the sake of example only, process 600 is described in relation to users 110a, 110b training concurrently, e.g., at the same time, but at different locations. For example, the first user may train at 6 PM local time in London, and the second user may train at 1 PM local time in Boston.

At 606, control circuitry, e.g., control circuitry of user device 102a, user device 102b and/or server 104, initiates a communication link for the event, e.g., at or in time for the start of the scheduled training session. For example, control circuitry may access a profile of each user to determine a calendar entry for each user to take part in the training session. In response to determining that the users 110a, 110b have a commonly-timed training session, control circuitry may initiate a communication link between user device 102a and user device 102b. In some examples, the users 110a, 110b may initiate a communication link for the event manually, e.g., using respective user devices 102a, 102b.

At 608, control circuitry, e.g., control circuitry of user device 102a and/or server 104, determines first route data for the first route 400, e.g., in a manner similar to that described under 302 above. In the example shown in FIG. 6, 608 comprises 610 and 612.

At 610, control circuitry, e.g., control circuitry of user device 102a and/or server 104, determines a condition of the first route. For example, control circuitry may access database 106, at 614, to determine elevation profile 402 of route 400 and/or the current weather conditions local to the first user 110a. In some examples, control circuitry may determine GPS data, e.g., using user device 102a, to establish a location of the first user 110a. In this manner, control circuitry can determine the physical and/or environmental conditions where the first user 110a is currently training. For example, user device 102a may determine that the first user 110a is at location 406 on the first route 400, where the incline of the route is 3.3% and the weather is currently mild. In some examples, control circuitry of user device 102a may determine a location of the first user 110a, e.g., by virtue of GPS tracking (or similar), and determine, e.g., using server 104 to access first route data, a physical and/or environmental condition of the first route 400 at the determined, e.g., current, location of the first user 110a. The physical and/or environmental condition of the first route 400 may be updated as the first user 110a moves along the first route 110, i.e., as the location of the first user 110a changes. Additionally or alternatively, control circuitry may be configured to perform a similar or corresponding determination for the second user 110b.

At 612, control circuitry, e.g., control circuitry of user device 102a and/or server 104, determines a pace of the first user. For example, control circuitry of user device 102a may be configured to determine the pace of the first user 110a as the first user 110a moves along the first route 400, e.g., by virtue of GPS tracking and/or one or more sensors of user device 102a. In some examples, user 110a may be wearing a fitness device configured to determine user data, such as a physiological data (e.g., a heartrate) and/or location data. The fitness device may be separate from user device 102a and configured to transmit user data to server 104/database 106 for access by user device 102a. In other examples, one or more functions of the fitness device may be incorporated into user device 102a.

At 616, control circuitry, e.g., control circuitry of user device 102b and/or server 104, determines second route data for the second route 404, e.g., in a manner similar to that described under 304 above. In the example shown in FIG. 6, 616 comprises 618 and 620, which are performed in a similar manner to 610 and 612, respectively. Control circuitry may be configured to perform 608 and 616 in series or in parallel. In some examples, 608 and 616 are performed separately, e.g., where the users 110a, 110b are training at different times. However, in the present example 608 and 616 are performed concurrently, e.g., as the users 110a, 110b are moving along respective routes 400 and 404.

At 622, control circuitry, e.g., control circuitry of at least one of user device 102a and 102b and/or server 104, provides pace indicator 500 to at least one of the users 110a, 110b. FIG. 5 shows pace indicator 500 provided to the first user 110a as they move along the first route 400. In particular, pace indicator 500 includes avatar 506, which provides a representation of the second user 110b to the first user 110a moving along the first route 400, e.g., as the first user runs across Tower Bridge (location 406), which is part of the route of the London marathon. Although not shown in the accompanying figures, a pace indicator may also be provided to the second user 110b as they move along the second route 404. In particular, the pace indicator may include an avatar, which provides a representation of the first user 110a to the second user 110b moving along the first route 400, e.g., as the second user runs up Heartbreak Hill (location 410), which is part of the route of the Boston marathon. 622 may be performed in a manner similar to that described under 306 of process 300.

At 624, control circuitry, e.g., control circuitry of at least one of user device 102a and 102b and/or server 104, determines whether there is a difference between a condition of the first route 400 and a condition of the second route 404, e.g., at the current locations of the users 110a, 110b. For example, based on the first and second route conditions determined at 610 and 620, control circuitry may determine whether the conditions at location 406 and location 410 are different, e.g., by accessing stored first and/or second route data at 626. In some cases, control circuitry may compare the incline at location 406 (Tower Bridge) to the incline at location 410 (Heartbreak Hill). Additionally or alternatively, control circuitry may compare one or more environmental conditions, such as wind speed/direction, temperature and a precipitation level, at the respective locations. In response to control circuitry determining that there is no difference in the conditions of the routes, or that there is a difference less than a difference threshold, process 600 moves back to 622. For example, such a determination may be made where the users 110a and 110b are training, e.g., on different days, in substantially the same conditions, e.g., along the same route (such as the same portion of the London marathon, i.e., the same incline) with similar weather conditions (such as weather conditions having a temperature difference of one or two degrees with negligible difference in wind speed). In other examples, the users 110a and 110b may be training concurrently at different locations having a difference in incline below an incline threshold, such as 0.1% or 0.5%. As such, where there is no difference, in the conditions of the routes, or that there is a difference less than a difference threshold, one or more current settings of pace indicator 500 may be maintained, e.g., to maintain one or more display parameters of avatar 506, such as the apparent or relative separation between the first user 110*a* and the avatar 506 in the XR environment. In some examples, information in graphical display element 510 of pace indicator 500 may be maintained to indicate to the first user 110*a* that they are training in substantially similar or the same conditions as the second user 110*b*. Conversely, in response to control circuitry determining that there is a difference in the conditions of the routes, or that there is a difference greater than or equal to a difference threshold, process 600 moves to 628 (or optionally to 636, shown by a dashed arrow on FIG. 6). For example, a difference in the route conditions may occur when weather conditions at the respective locations 406, 410 are different, e.g., owing to temperature, wind, etc. Additionally or alternatively, a difference in the route conditions may occur when the training surface at each location is different. For example, the first user 110*a* may be training at a running track, while the second user 110*b* may be training on the streets, or on grass, or a mixture of different surfaces. In some examples, information in graphical display element 510 of pace indicator 500 may be updated (e.g., a 636) to indicate to the first user 110*a* that they are training in conditions different from the second user 110*b*. In cases where process 600 moves from 624 to 636, one or more current settings of pace indicator 500 may be updated, e.g., in response to determining a change in a condition of at least one of the first and second routes 400, 404, to adjust one or more display parameters of avatar 506, such as the apparent separation between the first user 110*a* and the avatar 506 in the XR environment and/or the manner in which avatar 506 is animated. In cases where process 600 does not move, e.g., directly, from 624 to 636, 624 moves to 628.

At 628, control circuitry, e.g., control circuitry of user device 102*a* and/or server 104, determines an effort level for the first route 400, e.g., based on first route data determined at 608. For example, an effort level may relate to one or more measured or otherwise derived physiological parameters of the first user 110*a*, such as heart rate, energy expenditure, a perspiration level, body temperature, etc., e.g., using user device 102*a*, either alone or in combination with a fitness wearable. As such, a high effort level may be determined for the first route 400 when the first user's heart rate is high, e.g., 80% of their max heartrate, and/or when their current rate of energy expenditure is high, e.g., 800 kilocalories/hour. Additionally or alternatively, an effort level may relate to a level of effort required to complete at least a portion of the first route 400. In some examples, the effort level may be determined by assessing the topography of the first route 400, e.g., where an incline of the first route 400 is low, the effort level may be low, and where an incline of the first route 400 is high, the effort level may be high. In some examples, the effort level may be determined based on differences in conditions along the first route 400. For example, a first portion of the first route may have one associated effort level, and a second portion may have another, different associated effort level. Such associated effort levels may be based on current or historic first route data, e.g., relating to the first user 110*a* and/or data of one or more other users having completed at least a portion of the first route 400. In some examples, control circuitry may access first route data, at 630, and determine an effort level, e.g., a current effort level of the first user 110*a*, that is required to complete a current portion of the first route 400 at a predetermined pace, e.g., a desired pace that user 110*a* wishes to achieve, at least for that current portion of the route. For example, control circuitry may determine that first user 110*a* is at location 406, which has an average gradient of +/−0.25% over a certain distance, e.g., 500 m, of route 400. In order for the first user 110*a* to achieve a desired pace, e.g., 6 km/min for that portion, their effort level would need to be high, e.g., based on historic data for the first user 110*a* for a similar route and/or historic data of one or more other, different users that have completed that portion of the first route 400. In some examples, an effort level for the first route 400 may be a comparative effort level, e.g., compared to an effort level of the second route.

At 632, control circuitry, e.g., control circuitry of user device 102*b* and/or server 104, determines an effort level for the second route 404, e.g., based on second route data determined at 616. Such a determination may be performed in a manner similar to that described at 628. In some examples, 628 and 632 may be competed in parallel, e.g., as users 110*a* and 110*b* are currently training, so as to allow a current comparative effort level to be determined for the first and second routes 400, 404.

At 634, control circuitry, e.g., control circuitry of at least one of user device 102*a* and 102*b* and/or server 104, determines whether there is a difference between the effort level for the first route 400 and the effort level for the second route 400. For example, control circuitry may compare the effort level at location 406 of the first route 400 to the effort level at location 410 of the second route 404. In some examples, control circuitry may determine that the conditions of the first route 400 at location 406 (e.g., determined at 610) require a lower (e.g., on average) effort level than the conditions of the second route 404 at location 410 (e.g., determined at 620). In other examples, control circuitry may determine that an effort level of the first user 110*a* at location 406 is greater than an effort level of the second user 110*b* at location 410. This may occur despite the first user 110*a* moving along the first route 400 at location 406 at a slower pace than the second user 110*b* is moving along the second route 404 at location 410, which results from the first and second users 110*a*, 110*b* having differing levels of physical fitness and/or ability (or from one user simply not trying as hard as the other user).

At 636, control circuitry, e.g., control circuitry of user device 102*a* and/or server 104, updates pace indicator 500, e.g., in response to determining that there is a difference between the effort level of the first route 404 and the effort level of the second route 404 (and/or determining that there is a difference between the conditions of the first route 404 and the conditions of the second route 404). For example, graphical display element 510 of pace indicator 500 may be updated to indicate that a current effort level of the first user 110*a* is different from a current effort level of the second user 110*b*. For example, the first user 110*a* may increase their performance level for a period (e.g., an increased energy expenditure). As such, graphical display element 510 may display a smaller difference between respective effort levels of the users 110*a* and 110*b*. This is beneficial as it provides an indication to users of a difference between their respective effort levels and allows or incentivizes users to train at comparable effort levels, e.g., irrespective of the route conditions. Additionally or alternatively, control circuitry may update the apparent separation between the first user 110*a* and the avatar 506 in the XR environment and/or the manner in which avatar 506 is animated, based on a change in an effort level. For example, as the first user 110*a* increases their performance level, control circuitry may be configured to decrease the apparent separation between the first user 110*a* and the avatar 506 in the XR environment. The manner in which the apparent separation is adjusted may be scaled to account for various factors. For example, to avoid the first user 110*a* over taking the avatar 506, either entirely or within a short period, the apparent separation may be adjusted at a rate proportional to the rate at which the first user has increased their effort level. Moreover, despite the first user 110*a* increasing their effort level, their actual pace may still be less than the pace of the second user 110*b*. As such, it is beneficial to display to the first user 110*a* a decreased apparent separation between the first user and the avatar 506 in the XR environment, e.g., to encourage the first user 110*a* to try to catch the second user 110*b* by displaying a perceived decrease in their separation, owing to the period of increase performance of the first user 110*a*.

Additionally or alternatively, the pace indicator 500 may be updated based on the determined effort level for the first route, e.g., an energy expenditure of the first user 110*a*, and a condition of the second route 400. For example, control circuitry may be configured to compare the first user's effort level at location 406 (having an incline of 0.25%) to the required effort level at location 410 (having an incline of 3.3%). Such an example may be carried out where the first user 110*a* is training without the second user 110*b* currently participating in the training session. For example, control circuitry may be configured to update pace indicator 500 to indicate to the first user 110*a* that they need to increase their current pace should they wish to match an effort level that would otherwise be required to perform at the same level on the second route. To put this into context, the London marathon course is generally flat showing little change in elevation over the majority of the course (see 402), whereas the Boston marathon course has some changes in elevation, in particular at location 410. As such, the present systems and method provide a pace indicator that prompts a user to adjust their effort level for one course to simulate an effort level for another course. In particular, the present systems and method account for the differences between conditions of respective routes to indicate to a user on one route how their current effort level can be adjusted to experience what another user experiences on another route. For example, should the first user 110*a*, who is based in London, wish to train for the Boston marathon, control circuitry may provide a pace indicator that instructs the first user 110*a* to adjust their pace along the first route 400 such that they condition themselves for when they compete in the Boston marathon. For example, as the first user 110*a* crosses Tower Bridge at location 406, control circuitry may be configured to update pace indicator 500 to instruct the first user 110*a* to increase their effort level, e.g., their pace, to simulate running up Heartbreak Hill at location 410. As such, the present systems and method provide an improved virtual experience for fitness and exercise activities.

Figure 7:
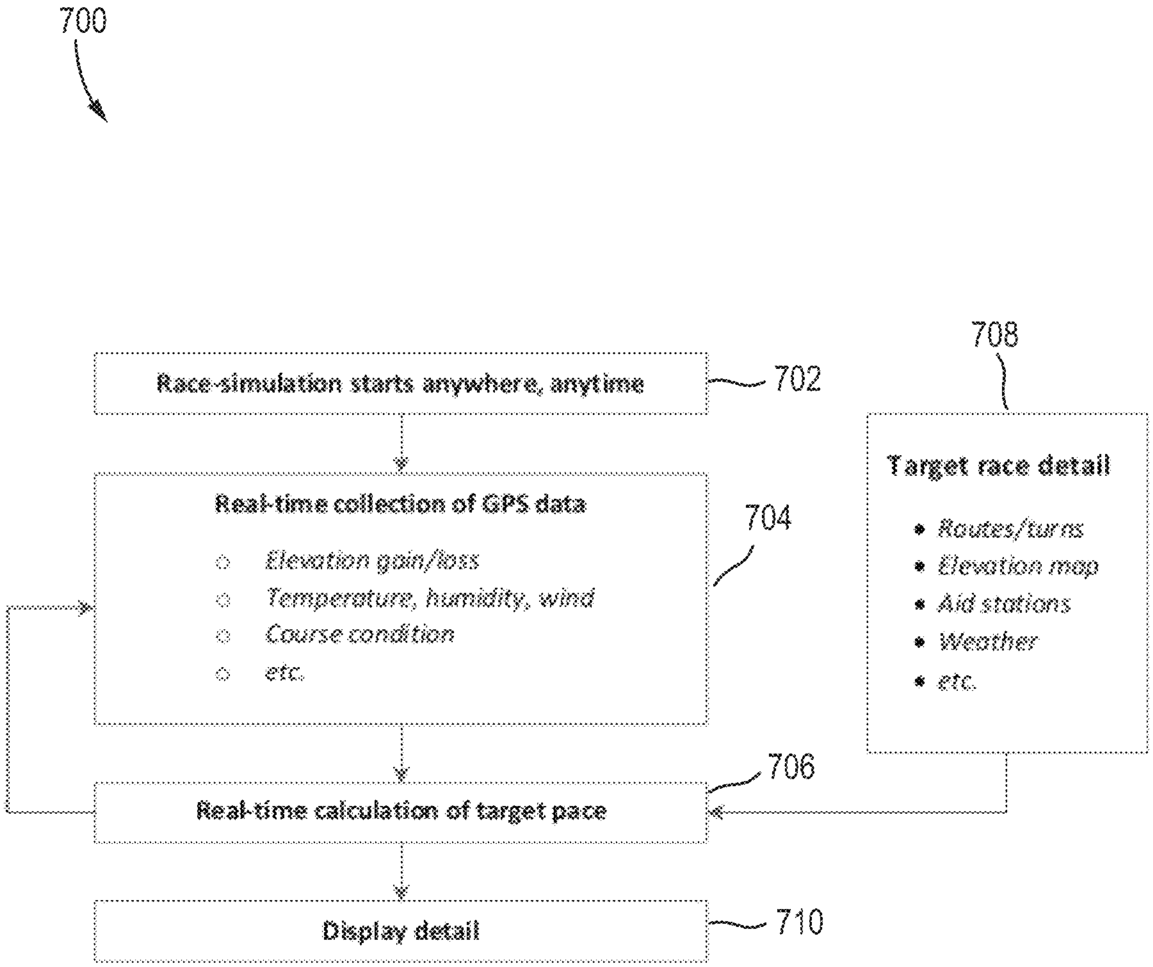
FIG. 7 is a flow chart representing a process for simulating conditions of a race.

The systems and methods disclosed herein move on from merely replicating a physical route and workout intensity through e.g., treadmill settings, including incline (or downhill), paces, etc. For example, in conventional systems, a target pace from one course may be converted to another course, e.g., by offline comparison and calculation. Those target paces, once pre-calculated, can be uploaded and later accessible through means during a workout or race. In some examples of the present disclosure, new features are implemented to improve the simulation of training for a target race, e.g., in real time. These are aimed at providing real time responses to an exercise, regardless of the physical route where the training takes place. In other words, it eliminates the need of travelling to a physical route with similar terrains and difficulties. This is important, since, in endurance training and racing, the perceived effort is important considering all the variations e.g., fitness level, weather, altitude, elevation changes, road condition, etc. In a simple comparison, 6 min/mile on flat may feel a lot easier than 6:20 min/mile on an uphill. In a race simulation, training on flat may suggest 5:50 min/mile pace if there is an uphill segment in a target race. This will help the user to experience the effort needed in the race. The systems and methods disclosed herein allow for real time calculation of corresponding pace during an activity and can take into account various factors, such as the current incline/decline and those of a corresponding segment of target race, e.g., assuming a synchronized start. Such a response to training is helpful to provide a close-to-reality experience of required intensity. Other factors such as altitude, temperature, humidity, wind, course condition, etc. can also be considered in the determination of a target pace. This again helps to make it less challenging when a user plans a race-simulation based on a weather forecast. For instance, an athlete trains for the Boston marathon as shown in FIG. 4B. She may run on a course of her preference at any time, e.g., the course of the London marathon. She warms up and starts anywhere. Once started, the route data of the Boston marathon will be in synchrony and used for real-time calculation of her target pace. For example, in the case that she runs on a flat segment while the corresponding Boston course is an uphill, the calculation may instruct a faster pace so that she feels an appropriate effort in attacking the uphill. In some examples, the simulation can be done for any segments in a target race, and it does not have to start from the start-line of a specific course. In other words, the athlete can choose a workout to cover miles 16 to 22 of the Boston marathon, which represents the most strenuous segment with multiple up hill segments late in the race. This is important, since endurance training theory does not recommend a workout of full race distance, since it prevents athletes from a good recovery and getting ready for the following workouts. FIG. 7 which shows process 700 for simulating conditions of a race as outlined above, process 700 comprising 702 to 710.

At 702, control circuitry, e.g., control circuitry of user device 102, determines that the user has started a race simulation. In some examples, the start of the race simulation may be user-initiated, e.g., by virtue of a command sent to user device 102, or may be automatically determined, e.g., by virtue of detecting that a user has started moving along a predetermined route and/or started moving along a route at a predetermined time.

At 704, control circuitry, e.g., control circuitry of user device 102, determines route data, e.g., in real time. For example, control circuitry may determine a current pace of the user and/or one or more conditions of the route, such as elevation, incline, temperature, surface condition, etc., as the user moves along the route.

At 706, control circuitry, e.g., control circuitry of user device 102, determines, e.g., in real time, a target pace for the user to move along the route. In particular, control circuitry accesses, at 708, second route data, which corresponds to a chosen route that the user want to simulate, such as the Boston marathon. The second route data comprises information relating to various factors that affect the condition of the second route, such as frequency of turns, route elevation, weather, waypoint locations, etc.

At 710, control circuitry, e.g., control circuitry of user device 102, provides a pace indicator to the user, e.g., to display detail or information, to indicate how the users effort can be adjusted so as to simulate an effort required to move along the second route at the target pace.

In some examples, an immersive XR experience may be provided by generating additional elements in display window 502 of pace indicator 500, such as simulated crowd support elements and spectator engagement elements (e.g., virtual fans and spectators), which may be accessed by a user device for generation in display window 502, e.g., via database 106. Thus, an enhanced experience may include both visual data display and audio cues. Additionally or alternatively, one or more waypoints and points of interest, such as water and aid stations of a race may be announced to the user or visible in the XR display, e.g., during a race-simulation training session. This helps to practice and improve hydration in endurance training and racing. The need of fluids and nutrients intake including water, sports drink and gels can also be estimated for the training and racing. The estimates and predictions can be made in real time during the actual training and racing, e.g., based on the comparisons made at 624 and/or 634 of process 600.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

determining, using control circuitry, first route data of a first route, wherein the first route data comprises a pace of a first user moving through a first plurality of locations along the first route;

determining, using the control circuitry, second route data of a second route, wherein the second route data comprises a pace of a second user moving through a second plurality of locations along the second route and the second plurality of locations is geographically separated from the first plurality of locations, wherein the second route data further comprises a topography of the second route at the second plurality of locations; and providing, using the control circuitry, a pace indicator to the first user moving along the first route based on the first route data and the second plurality of locations of the second route data, wherein the pace indicator comprises an avatar moving along the first route in an extended reality environment, the avatar representing the second user moving along the second route, wherein providing the pace indicator comprises adjusting one or more display parameters of the avatar based at least in part on a difference between a topography of the first route at the first plurality of locations and the topography of the second route at the second plurality of locations.

2. The method according to claim 1, the method comprising:

determining, concurrently, the pace of the first user moving through the first plurality of locations along the first route and the pace of the second user moving through the second plurality of locations along the second route; and providing the pace indicator as the first user moves through the first plurality of locations along the first route and the second user moves through the second plurality of locations along the second route.

3. The method according to claim 1, the method comprising:

scheduling an event comprising the first user moving through the first plurality of locations along the first route and the second user moving through the second plurality of locations along the second route; and initiating a communication link between the first user and the second user for the event.

4. The method according to claim 1, wherein the first route data comprises an environmental condition of the first route, and the second route data comprises an environmental condition of the second route, wherein the environmental condition comprises one or more of a precipitation level, a temperature, or a wind speed at the respective first and second plurality of locations.

5. The method according to claim 4, the method comprising:

determining a difference between the environmental condition of the first route and the environmental condition of the second route; and updating the pace indicator in response to the difference between the environmental condition of the first route and the environmental condition of the second route being above a difference threshold.

6. The method according to claim 1, the method comprising:

determining an effort level of the first user moving through the first plurality of locations along the first route;

determining an effort level of the second user moving through the second plurality of locations along the second route;

determining whether there is a difference between the effort level of the first user moving through the first plurality of locations along the first route and the effort level of the second user moving through the second plurality of locations along the second route; and in response to determining that there is a difference, updating the pace indicator.

7. The method according to claim 1, the method comprising:

determining a position of the avatar in the extended reality environment relative to the first user based on the second route data.

8. The method according to claim 7, wherein a scaling function is applied to the second route data.

9. The method according to claim 1, wherein the pace indicator is provided in real time or near real time.

10. The method of claim 1, further comprising:

determining a current location of the first user along the first route and a current location of the second user along the second route, wherein the first route data and the second route data are determined based on the respective current locations.

11. The method of claim 1, further comprising:

determining a corresponding location on the second route based on progress of the first user along the first route, wherein the pace indicator is provided based on the corresponding location on the second route.

12. A system comprising control circuitry configured to:

determine first route data of a first route, wherein the first route data comprises a pace of a first user moving through a first plurality of locations along the first route;

determine second route data of a second route, wherein the second route data comprises a pace of a second user moving through a second plurality of locations along the second route and the second route is geographically separated from the first plurality of locations, wherein the second route data further comprises a topography of the second route at the second plurality of locations; and provide a pace indicator to the first user moving through the first plurality of locations along the first route based on the first route data and the second plurality of locations of the second route data, wherein the pace indicator comprises an avatar moving along the first route in an extended reality environment, the avatar representing the second user moving through the second plurality of locations along the second route, wherein providing the pace indicator comprises adjusting one or more display parameters of the avatar based at least in part on a difference between a topography of the first route at the first plurality of locations and the topography of the second route at the second plurality of locations.

13. The system according to claim 12, wherein the control circuitry is configured to:

determine, concurrently, the pace of the first user moving through the first plurality of locations along the first route and the pace of the second user moving through the second plurality of locations along the second route; and provide the pace indicator as the first user moves through the first plurality of locations along the first route and the second user moves through the second plurality of locations along the second route.

14. The system according to claim 12, wherein the control circuitry is configured to:

schedule an event comprising the first user moving through the first plurality of locations along the first route and the second user moving through the second plurality of locations along the second route; and initiate a communication link between the first user and the second user for the event.

15. The system according to claim 12, wherein the first route data comprises an environmental condition of the first route, and the second route data comprises an environmental condition of the second route, wherein the environmental condition comprises one or more of a precipitation level, a temperature, or a wind speed at the respective first and second plurality of locations.

16. The system according to claim 15, wherein the control circuitry is configured to:

determine a difference between the environmental condition of the first route and the environmental condition of the second route; and update the pace indicator in response to the difference between the environmental condition of the first route and the environmental condition of the second route being above a difference threshold.

17. The system according to claim 12, wherein the control circuitry is configured to:

determine an effort level of the first user moving through the first plurality of locations along the first route;

determine an effort level of the second user moving through the second plurality of locations along the second route;

determine whether there is a difference between the effort level of the first user moving through the first plurality of locations along the first route and the effort level of the second user moving through the second plurality of locations along the second route; and in response to determining that there is a difference, update the pace indicator.

18. The system according to claim 12, wherein the control circuitry is configured to:

determine a position of the avatar in the extended reality environment relative to the first user based on the second route data.

19. The system according to claim 18, wherein the control circuitry is configured to apply a scaling function to the second route data.

20. The system according to claim 12, wherein the control circuitry is configured to provide the pace indicator in real time or near real time.

* * * * *